United States Patent [19]

Heller

[11] 4,429,594

[45] Feb. 7, 1984

[54] PLANETARY SPEED REDUCER

[75] Inventor: Werner H. Heller, West Valley, N.Y.

[73] Assignee: UMC Industries, Inc., Stamford, Conn.

[21] Appl. No.: 257,928

[22] Filed: Apr. 27, 1981

[51] Int. Cl.³ .............................................. F16H 3/44
[52] U.S. Cl. ..................... 74/788; 74/785; 74/797; 74/801
[58] Field of Search ................ 74/797, 801, 785, 788

[56] References Cited

U.S. PATENT DOCUMENTS

| | | | |
|---|---|---|---|
| 507,695 | 10/1893 | Thomson | 74/801 |
| 1,431,167 | 10/1922 | McCollum | 74/801 |
| 1,502,107 | 7/1924 | McCollum | 74/801 |
| 2,456,814 | 12/1948 | Church | 74/801 |
| 2,547,475 | 4/1951 | Larsen | 74/801 |
| 3,081,648 | 3/1963 | Duer | 74/801 |
| 3,421,390 | 1/1969 | Lohr | 74/801 |
| 3,453,906 | 7/1969 | Ito | 74/801 |
| 3,675,510 | 7/1972 | Duggar | 74/801 |
| 3,792,629 | 2/1974 | Applebury | 74/801 |
| 4,040,312 | 8/1977 | Tappan et al. | 74/801 |
| 4,043,226 | 8/1977 | Buuck | 74/801 |
| 4,091,688 | 5/1978 | Huffman | 74/785 |
| 4,116,293 | 9/1978 | Fukui | 180/43 B |

FOREIGN PATENT DOCUMENTS 584143 12/1977 U.S.S.R. ............................ 74/801

Primary Examiner—Lawrence J. Staab
Assistant Examiner—Joseph M. Rolnicki
Attorney, Agent, or Firm—Allen J. Jaffe

[57] ABSTRACT

A planetary speed reducer having a movable output ring gear; a stationary or fixed ring gear; the ring gears having different numbers of rigid involute teeth, different pitch diameters, equal internal diameters and equal base pitches; a sun gear; and at least one planetary gear mounted for engagement with the sun gear and with each of the ring gears.

9 Claims, 3 Drawing Figures

U.S. Patent  Feb. 7, 1984  4,429,594
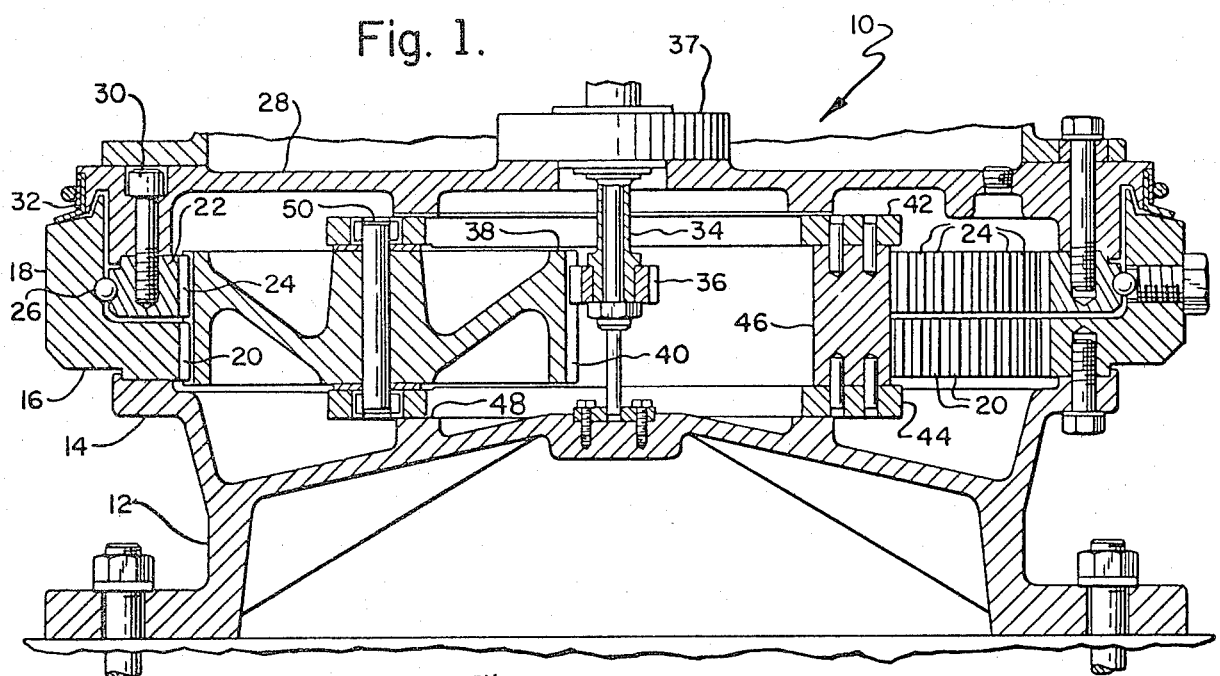
Fig. 1.
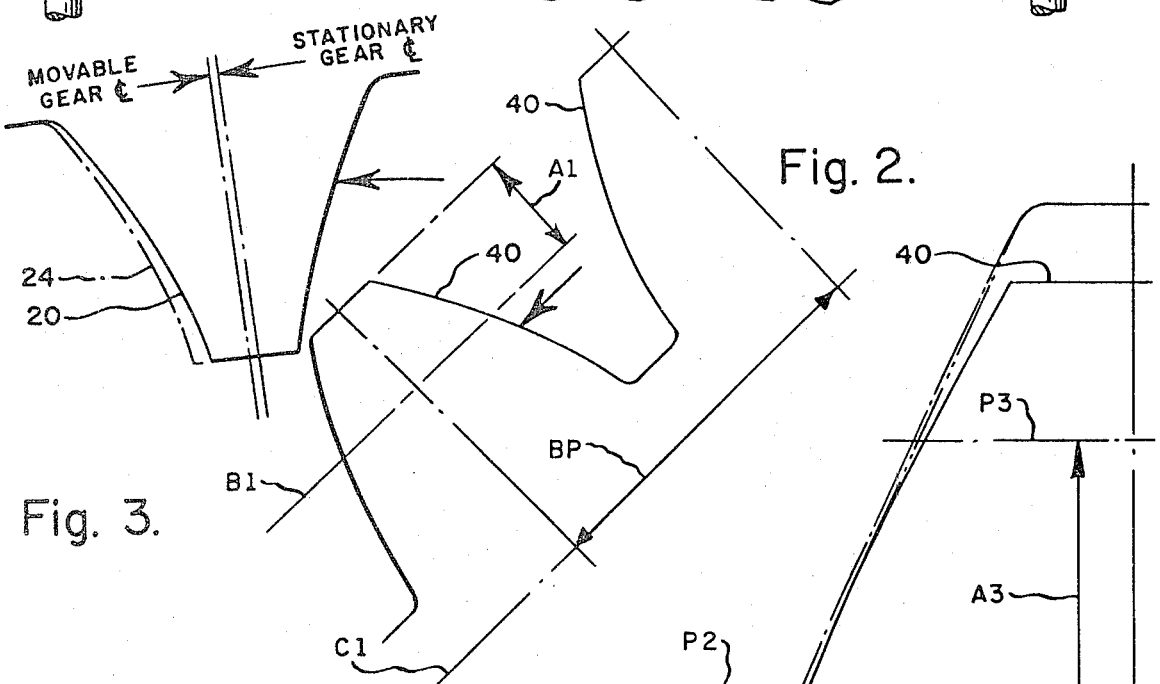
Fig. 2.
Fig. 3.

PLANETARY SPEED REDUCER

BACKGROUND OF THE INVENTION

The present invention relates to planetary speed reducers and, more particularly, to such reducers of the type having an input sun gear, an output ring gear, a fixed ring gear and one or more planetary gears in mating engagement with the sun and the ring gears.

As is well known, very high reduction ratios are obtainable with speed reducers of the aforesaid type. However, to develop an output, the fixed ring gear and the output or movable ring gear must differ in their number of teeth. This requirement has typically necessitated the employment of two different sets of planetary gears; one set of which meshing with the fixed ring gear and the other set of which meshing with the output or movable ring gear. In addition to the added expense of a second set of planetary gears, such an arrangement is difficult and time-consuming to assemble in that each of the planetary gears of one set must be precisely indexed with respect to its corresponding gear of the other set.

As an alternative arrangement, various prior art devices have been proposed whereby a single set of planetary gears mates with both the fixed and the movable ring gear.

One such prior art arrangement is disclosed in U.S. Pat. No. 3,081,648 wherein the fixed ring gear and the movable output ring gear differ slightly in their number of teeth and engage three planetary gears having a single tooth configuration. The teeth of all the gears are fabricated of plastic material permitting an inherent but limited degree of gear tooth flexibility. Further, the teeth on two of the planetary gears are staggered in opposite directions; with those on the third planetary gear remaining essentially straight.

Another prior art device, disclosed in U.S. Pat. No. 3,675,510, also employs resilient gears which permit free floating planetary gears to yield along their diametral dimension to allow assembly in spite of an intentional interference fit between the gears.

A third device is disclosed in prior U.S. Pat. No. 3,792,629. In the apparatus of this patent the speed reducer comprises a stationary housing having secured thereto a sun gear adapted to drive a plurality of planetary gears which perform two functions. One is to cooperate with the sun gear and a fixed ring gear and the other is to retard or advance a movable ring gear that serves as an output. The output motion is obtained by changing the number of teeth on one of the ring gears without changing the pitch diameter thereof. This method of tooth spacing results in a deliberate mismatch of the gears which causes the movable or output ring gear to rotate relative to the fixed ring gear. The omission or addition of but one tooth is stated as preferable. In one configuration one of the ring gears is reduced slightly in pitch diameter to accommodate one less tooth and its corresponding planetary gear face is similarly reduced by one tooth.

SUMMARY OF THE INVENTION

In accordance with the teaching of the present invention, a speed reducer of the fixed differential planetary tape is provided wherein the fixed and movable ring gears have different numbers of rigid nonflexible teeth, have different pitch diameters, have the same normal or base pitch, have identical internal diameters and mesh with a single set of planetary gears which are also of rigid non-flexible construction and which have the same normal or base pitch as the ring gears.

In this manner, a precision speed reduction system is provided wherein proper involute mating engagement is obtained without any interference fits, without excessive clearances or backlash, and without deliberate mismatching of gear teeth or the like. At the same time the speed reducer of the present invention provides an arrangement that is compact, efficient, relatively inexpensive and easy to assemble.

The speed reducer of this invention is so constructed and arranged as to take advantage of the gear design principle that for any two involute gears to mesh properly they must have the same base pitch. In other words, the respective products of the circular pitch and the cosine of the pressure angle for each of the mating gears must be equal. According to the present invention, modifications are made to the standard addendums of the ring gears such that the difference in pitch diameters thereof (due to their differences in number of teeth) is equal to twice the absolute value of addendum changes in the ring gears. In this manner, both ring gears can be provided with identical internal diameters for proper involute meshing with a single planetary gear or a single set of planetary gears. In all other respects, however, the gears are of standard involute configuration and can be easily fabricated from the same shaper cutting tool. The resulting differences in addendum between each ring gear is similarly equal to one-half the difference in pitch diameters thereof.

Essentially, then, the present invention provides a speed reducer of the planetary gear type, comprising: a gear casing; a first ring gear fixedly mounted with respect to the casing; a second ring gear rotatably mounted with respect to the casing; the ring gears having different numbers of teeth, different pitch diameters, equal internal diameters and equal base pitches; a sun gear rotatable mounted with respect to the casing; and at least one planetary gear in simultaneous mating engagement with said first and second ring gears and with said sun gear.

Other characterizing features and advantages of the present invention will become readily apparent from the ensuing detailed description thereof.

BRIEF DESCRIPTION OF THE DRAWINGS

For a fuller understanding of the present invention reference should now be made to the following detailed description thereof taken in conjunction with the accompanying drawings, wherein:

FIG. 1 is a cross-sectional view of the planetary speed reducer constructed in accordance with the present invention;

FIG. 2 is an enlarged fragmentary view depicting the relationship between a tooth of the planetary gear and its mating tooth on each of the fixed and movable ring gears; and FIG. 3 is a fragmentary view similar to FIG. 2 but depicting the planetary gear tooth in its position of disengagement with a tooth on each of the fixed and movable ring gears.

DETAILED DESCRIPTION OF THE PREFERRED EMBODIMENT

Referring in detail to the drawings, the planetary speed reducer is generally depicted at 10 in FIG. 1 and is shown as including a supporting base member 12 having a circular flange 14 to which is fixedly secured a stationary ring gear 16 having an outer upstanding rim 18 and a plurality of internal, involute gear teeth 20. It can be seen that base member 12 and upstanding rim 18 provide a stationary casing for the movable components of the speed reducer. To this end, an output or movable ring gear 22, having a plurality of internal, involute teeth 24 is nested within rim 18 and supported for rotary movement with respect thereto by suitable bearings 26. Output ring gear 22 is fixedly secured to a cover plate 28 by suitable fasteners 30 or the like. Cover plate 28 is mounted for rotation with respect to fixed ring gear 18 by means of a suitable sliding clamp seal 32 or the like is provided with a central opening for the reception of an input drive shaft 34 to which is fixedly secured a sun gear 36. A suitable bearing assembly 37 is provided to permit relative rotational movement of sun gear 36 and cover plate 28.

At least one planetary gear 38 is located between sun gear 36 and ring gears 16 and 24 and having involute gear teeth 40 in mating engagement therewith. The axial depth of planetary gear 38 is sufficient to span the teeth of both ring gears 16 and 22 for simultaneous mating engagement therewith. A compact planetary carrier frame is provided in the form of a pair of spaced annular plates 42 and 44 interconnected at suitable spaced points about their peripheries by vertical posts 46 or the like. Plates 42 and 44 are located between cover plate 28 and base member 12 and are slidably supported by an inner annular bearing surface 48 of base member 12 in concentric relation to the axis of sun gear 36. Planetary gear 38 is suitably mounted for rotational movement with respect to carrier plates 42 and 44 by means of a journal pin 50 or the like which passes through the central hub of gear 38 and is secured to the plates 42 and 44. Although only one planetary gear 38 is illustrated, it should be understood that additional equally spaced gears may be provided as is well known. The ring gears 16 and 18, the planetary gear or gears 38 and the sun gear 36 are all preferably fabricated of any suitable rigid, non-flexible material such as, for example, hardened steel.

In order to obtain output rotation of ring gear 22 in response to input rotary movement of sun gear 36, it is necessary that the ring gears 16 and 22 have different number of teeth. It, therefore, becomes necessary for the single rapid planetary gear or gears 38 to properly mesh with the two rigid gears 16 and 22 which are of different pitch diameters and which operate on the same center distance. According to the present invention, proper involute mating contact is achieved by modification of the standard addendum dimensions of the ring gears to yield equal internal diameters. More specifically, the addendum of the greater toothed ring gear is increased and that of the lesser toothed ring gear is decreased such that the difference between the two addendums is equal to one-half the difference between the pitch diameters of the gears. As long as the base pitches of each of the ring gears remain equal, then proper involute mating contact is ensured. The magnitude of addendum modification of each of the ring gears is such as to result in each having identical internal diameters for mating contact with the planetary gear or gears. As used herein, the terms "planetary gear" or "planetary gears" should be construed as either a single planetary gear (either integrally formed or fixedly joined together on a common shaft or hub) or a plurality of such gears equally spaced about the sun gear for simultaneous mating engagement with both of the ring gears and wherein there is no off-set or difference in phase between the portion of each gear engaging one ring gear and the portion thereof engaging the other ring gear, in the case of straight spur gears; or of constant and continuous helix or lead angle, in the case of helical gears. In other words, if the planetary gears are spur gears, they each have constant cross-sectional profiles along their axial depth; whereas if they are helical gears, the axial cross-sectional profiles differ only as a function of their lead angle. Thus, whether spur gears or helical gears are employed for planetary gear 38, a common set of teeth is provided for simultaneous mating engagement with both ring gears 16 and 22 and with sun gear 36.

The difference in number of teeth between the ring gears is dependent upon the desired reduction ratio, as is well known, and upon the number of planetary gears equally spaced about the sun gear. To properly assemble the gears, the respective tooth sums of each ring gear and the sun gear divided by the number of planetary gears must result in a whole number. Thus if two planetary gears are employed, the difference in the number of teeth of the stationary ring gear and the output ring gear must equal two or a multiple of two. If three planetary gears are employed, the difference in the number of teeth of the stationary ring gear and the output ring gear must equal three or a multiple of three.

An illustrative example of a gear train fulfilling the above requirements is as follows, for a center distance between the axis of the sun gear and that of three equally space planetary gears of 4.9 inches:

|  | STATIONARY RING GEAR | OUTPUT RING GEAR |
|---|---|---|
| NUMBER OF TEETH | 182 | 179 |
| DIAMETRAL PITCH | 10 | 10 |
| PITCH DIAMETER | 18.2" | 17.9" |
| ADDENDUM HEIGHT INCREASE | 0.125" | −0.025" |
| ADDENDUM HEIGHT | 0.22" | 0.07" |
| INSIDE DIAMETER | 17.76" | 17.76" |
| PRESSURE ANGLE (degrees) | 25 | 25 |
| BASE PITCH | 0.284725" | 0.284725" |

Although not essential it would be good practice in the above example to modify the addendums of the planetary gears and the sun gear as follows, for purposes of avoiding undercut or preventing sharp profiles as is well known:

|  | PLANET GEAR | SUN GEAR |
|---|---|---|
| NUMBER OF TEETH | 82 | 16 |
| DIAMETRAL PITCH | 10 | 10 |
| PITCH DIAMETER | 8.2" | 1.6" |
| ADDENDUM HEIGHT INCREASE | −0.025" | 0.025" |
| ADDENDUM HEIGHT | 0.07" | 0.12" |
| OUTSIDE DIAMETER | 8.34" | 1.84" |
| PRESSURE ANGLE (degrees) | 25 | 25 |
| BASE PITCH | 0.284725" | 0.284725 |

As seen from the above example the base pitches of all the gears are equal to thereby provide proper involute engagement; this being the case even though the pitch diameters of the ring gears are different and the internal diameters thereof are equal. The relationship between the output ring gear teeth 24, the fixed ring gear teeth 20 and the planetary gear teeth 40 are depicted schematically in FIGS. 2 and 3. As shown in FIG. 3 the pitch circle for gear 40 is schematically depicted at B1; the base circle at C1; the addendum at A1; and the base pitch at BP. Similarly, in FIG. 2, the pitch circles for gears 20 and 24 are depicted at P2 and P3, respectively; and the addendums for gears 20 and 24 are depicted at A2 and A3, respectively. The base pitch for gears 20 and 24 are equal to each other and also equal to base pitch shown for gear 40; therefore, the base pitches are not separately illustrated for gears 20 and 24. It should be apparent that proper mating engagement is achieved despite the difference in pitch diameters of the ring gears, and that the planetary gears can be easily assembled in mesh with both ring gears. In this example the overall reduction ratio for the compound gear train is 739.375:1. Thus, for every 739.375 revolutions of the sun gear the output gear ring makes one revolution. Although in the foregoing example the movable ring gear has been depicted as the larger toothed gear, it should be apparent that the smaller toothed gear could be the movable ring gear as is well known to those skilled in the art.

It should also be apparent that although the foregoing description and example related to gears of involute tooth forms, it would be possible to obtain proper meshing engagement (according to the teachings of the present invention) by similar modifications to gears having other than involute tooth configurations so long as they are constructed in accordance with the design principles governing their respective tooth forms. Thus, as used herein and in the appended claims the terms "pitch diameters," "base pitches," "addendum" and the like should be construed as including such terms as are used in involute gear systems as well as their equivalents in other tooth systems.

A preferred embodiment of the present invention has been disclosed and described; however, changes will obviously occur to those skilled in the art without departing from the spirit thereof. It is, therefore, intended that the invention is to be limited only by the scope of the appended claims.

What is claimed is:

1. A planetary speed reducer, comprising:
a gear casing;
a first ring gear fixedly mounted with respect to said casing;
a second ring gear rotatably mounted with respect to said casing;
said ring gears having different numbers of teeth, different pitch diameters, equal internal diameters and equal base pitches;
a sun gear rotatably mounted with respect to said casing;
at least one planetary gear having a common set of teeth for simultaneous mating engagement with said first and second ring gears and with said sun gear; and wherein
said first and second ring gears have an addendum difference that is equal to one-half their difference in pitch diameters.

2. The speed reducer according to claim 1, wherein:
said gears are of rigid nonflexible construction having involute teeth.

3. The speed reducer according to claim 2, wherein:
the difference in number of teeth between said first and second ring gears is a whole number multiple of the number of said planetary gears in simultaneous mating engagement therewith.

4. The speed reducer according to claim 3, wherein:
said planetary gear has integrally formed teeth of sufficient axial depth to span the teeth of each of said first and second ring gears.

5. The speed reducer according to claim 3, wherein:
said first ring gear is integrally formed with at least a portion of said casing and has a circular outer rim projecting therefrom; and
said second ring gear is nested within said rim.

6. The speed reducer according to claim 3, wherein:
said planetary gears each have constant cross-sectional profiles along their axial depth.

7. The speed reducer according to claim 5, further comprising:
a cover plate fixedly mounted to said second ring gear; and
a planetary carrier mounted for rotational movement between said cover plate and a portion of said casing.

8. The speed reducer according to claim 7, wherein:
said last mentioned portion comprises a base member fixed to said first ring gear and having a support surface in sliding contact with said planetary carrier.

9. The speed reducer according to claim 6, wherein:
the base pitches of said planetary gears and of said sun gear equals that of said first and second ring gears.

* * * * *